UNITED STATES PATENT OFFICE.

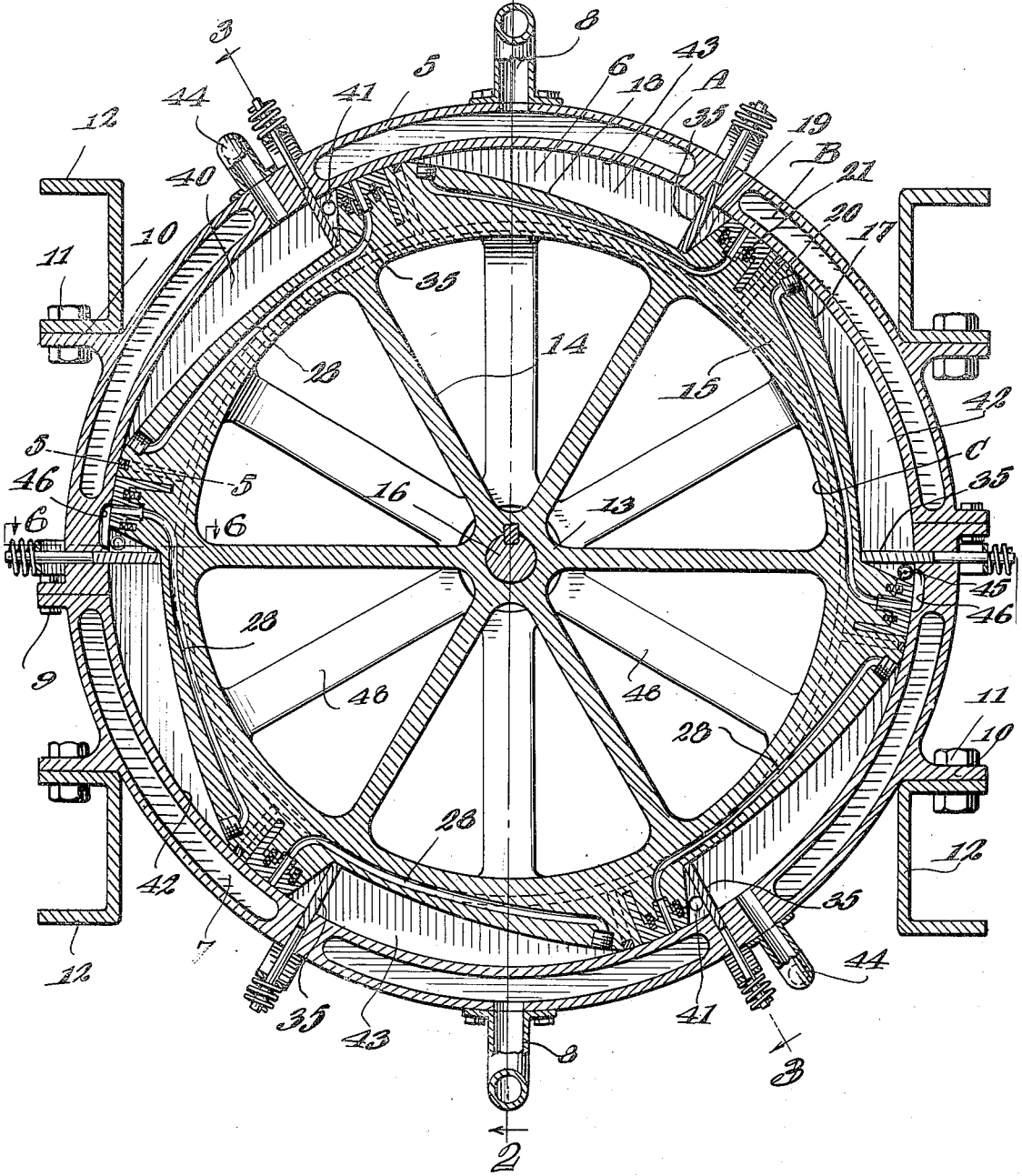

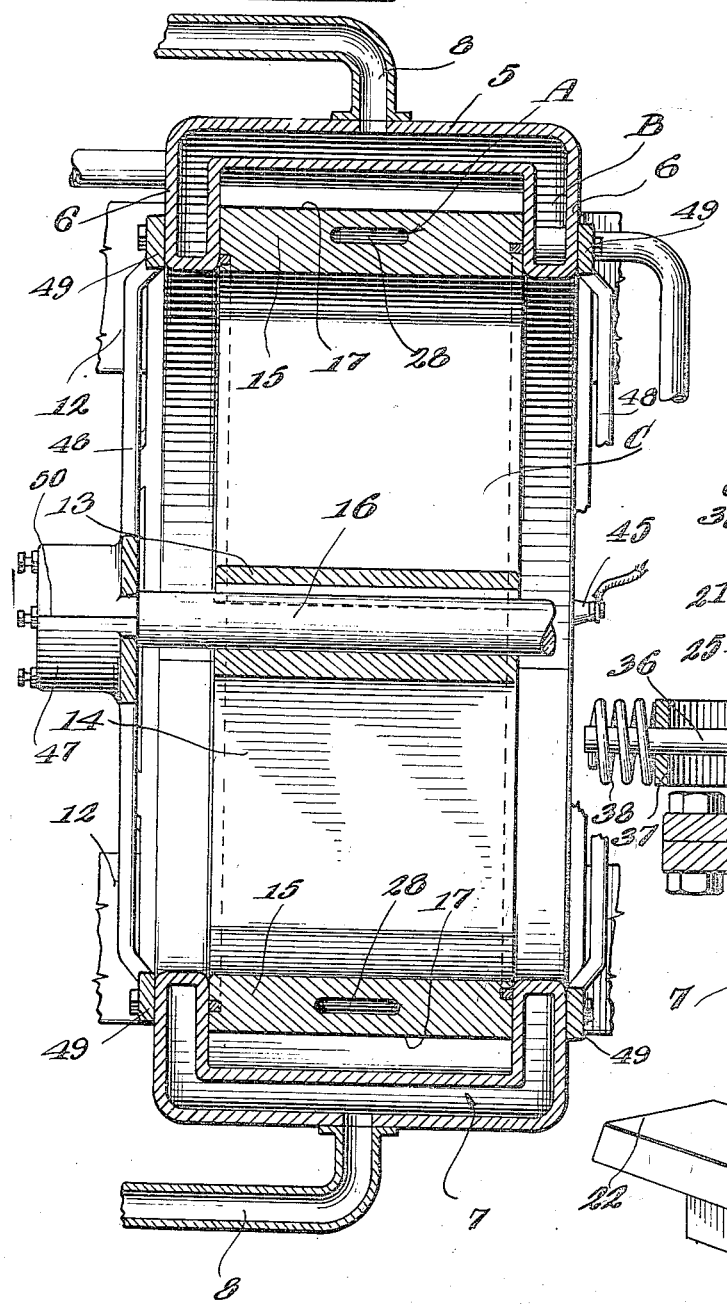
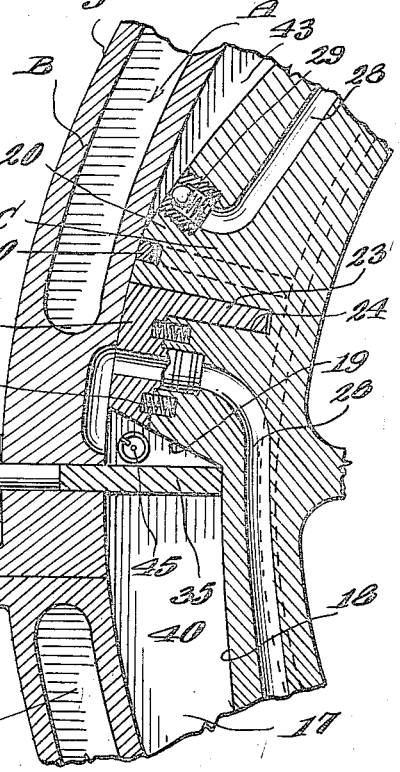
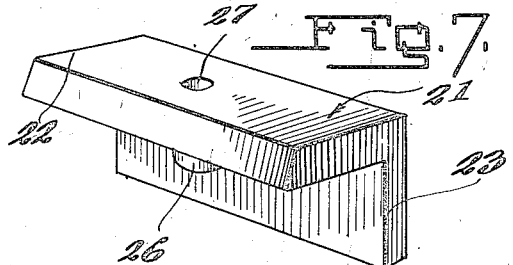

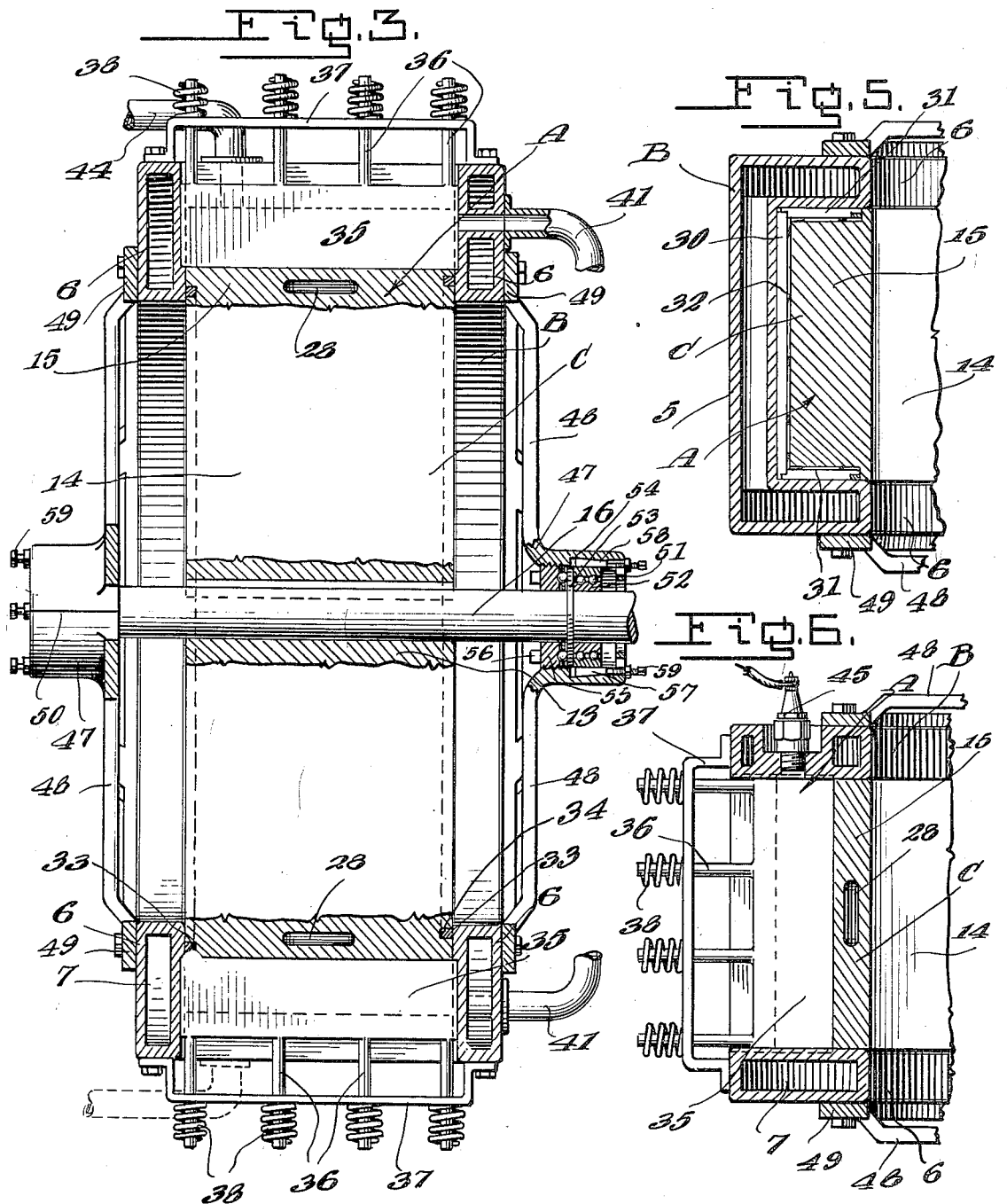

WESLEY K. DAVIS, OF MACON, GEORGIA.

ROTARY INTERNAL-COMBUSTION ENGINE.

1,402,057.  Specification of Letters Patent.  Patented Jan. 3, 1922.

Application filed May 3, 1920. Serial No. 378,527.

*To all whom it may concern:*

Be it known that I, WESLEY K. DAVIS, a citizen of the United States, residing at Macon, in the county of Bibb and State of Georgia, have invented certain new and useful Improvements in Rotary Internal-Combustion Engines, of which the following is a specification.

This invention relates to internal combustion engines, and the primary object of the invention is to provide an improved rotary internal combustion engine which entirely eliminates the reciprocating pistons used in the ordinary internal combustion engine, and all other complicated mechanisms associated therewith, such as the crank shaft, connecting rods, crank case and the like.

Another object of the invention is to provide an improved rotary internal combustion engine in which all of the units delivering power travel in one and the same direction, thereby providing a steady uninterrupted flow of power to be transmitted directly to the drive shaft.

A further object of the invention is to provide an improved rotary internal combustion engine in which two or more explosions or power impulses are transmitted at diametrically opposed points, to the rotor, thereby absorbing and balancing all vibrations, the explosions or power impulses being applied at the periphery of the rotor and at the maximum distance from the center of the rotor, thereby increasing the leverage of the power stroke to its maximum efficiency.

A further object of the invention is to provide an internal combustion engine having an improved and simplified means for sucking in the charge, for compressing the same and for forcing the burnt gases from the device. This improved means entirely eliminates the principal difficulty found with the rotary internal combustion engines, namely the means for sucking in the charge, for compressing the same and for forcing the burnt gases from the device.

A still further object of the invention is to provide an improved means for associating the rotor with the stator so that all loss of power is absolutely prevented.

A still further object of the invention is to provide an improved internal combustion engine of the turbine type which is durable and efficient in use, one that is simple and easy to manufacture, and one which can be placed upon the market at a reasonable cost.

Other objects and advantages of the invention will appear in the following detailed description taken in connection with the drawings, in which:

Figure 1 is a central vertical section taken circumferentially through the improved motor.

Figure 2 is a diametric section taken on the line 2—2 of Figure 1.

Figure 3 is a similar view taken on the line 3—3 of Figure 1.

Figure 4 is an enlarged fragmentary vertical section through the improved motor, illustrating the means of forcing the compressed charge into the firing chamber.

Figure 5 is an enlarged fragmentary section taken on the line 5—5 of Figure 1.

Figure 6 is a fragmentary section taken on the line 6—6 of Figure 1, and

Figure 7 is a detail perspective view of one of the spring pressed members.

Referring to the drawings in detail, wherein similar reference characters designate corresponding parts, throughout the several views, the letter A generally indicates the improved motor, which includes the stator B, and the rotor C.

The stator B is of annular formation, constructed in such a manner that a relatively light frame is provided and in which all loss of material is obviated.

The stator B includes the annular outer wall 5 and the spaced parallel inwardly extending side walls 6. The outer wall and side walls 5 and 6 are provided with water chambers 7, so that the motor may be cooled and the water is forced through the chambers in any preferred manner and inlet and return pipes 8 communicate therewith at diametrically opposite points. As shown, the stator B is formed of a pair of substantially semicircular sections, which are bolted or otherwise secured together as at 9, as clearly shown in Figure 1 of the drawings. Outwardly extending fins 10 are formed on the outer walls 5, and these fins form means whereby the stator may be bolted or otherwise secured as at 11 to a suitable frame or the like 12. The outer wall 5 and the spaced parallel side walls 6 define a substantially U-shaped construction in cross section and this U-shaped construction is adapted to receive the rim of the rotor which will now be more fully described.

The rotor C is arranged in concentric relation to the stator B and the same includes a hub 13, radially extending spokes 14 and an annular relatively heavy rim 15. The hub 13 has keyed or otherwise secured thereto the drive shaft 16 which is adapted to be connected to the work in any preferred manner.

The shaft 16 is preferably mounted in suitable bearings 47 carried by spiders 48, which include annular rims 49 which are bolted or otherwise secured to the outer face of the stator. The two spiders 48 are preferably cast in halves and connected as at 50 so that when either of the semi-circular castings comprising the stator are removed, the spider on each side thereof can also be removed. Annular ball bearings 51 are provided and the cores 52 thereof are secured to the shaft 16. The shaft 16 also has formed thereon outwardly extending annular shoulders 53 and a ball bearing 54 is arranged on the shaft at one side of the shoulder. This bearing forms means for taking up the thrust on the shaft. An adjusting nut is turned into the bearing and forms means for holding the thrust bearing in place. Lugs 56 are formed on the inner surface of the nut and form means for permitting the nut to be readily rotated by a tool. The bearings 51 are adjustably mounted so as to permit the exact aligning of the shaft 15. The adjusting means for the bearings 51 include arcuate segmental wedge shaped members 57 which engage stationary wedge shaped members 58. The sliding wedge members 57 are adjusted by means of screws 59. The relatively heavy rim 15 has the outer face of its periphery provided at spaced points with cam shaped chambers 17, which as shown occupy substantially one-sixth of the circumference of the rim but it is to be understood that any number of the chambers may be provided as found desirable or applicable. Each of the cam chambers defines the inclined lower wall 18 and the abrupt end wall or shoulder 19. Each of the chambers 17 are separated by radially extending projections 20 which carry the spring pressed members 21, which prevent the leakage of the charge and the products of combustion from one chamber to the other. Each of the members 21 includes a pair of right angular arms 22 and 23 and the outer arm is adapted to engage the outer face of the projection 20, which is cut away to receive the same.

As clearly shown in Figure 4 of the drawings, the outer face of the arm 22 extends flush with the outer face of the projection 20 when the motor is in operation. The inner arm 23 of each of the members is slidably fitted in an inwardly extending recess 24 formed in the projection and the arm 23 provides a guide for the member. The members as stated are spring pressed and are normally urged outwardly by means of expansion springs 25 which are fitted in sockets formed in the projections 20 and the members 21. Each member 21 carries a depending sleeve 26, which registers with an opening 27 formed in the member. The sleeve 26 is provided with suitable piston rings so as to prevent the leakage of the charge from around the same. The sleeve 26 as shown is adapted to slidably fit in the enlarged portion of a bore 28 which extends from one end of each of the chambers to the other, and these bores, as shown, open out at the relatively narrow portion of the chamber and at the projections between the chambers. The inner ends of these bores which communicate with the relatively narrow portions of the chambers are provided with suitable ball spring check valves 29, for a purpose which will hereinafter more fully appear. To further prevent the leakage of the products of combustion from one chamber to the other, strips 30 and 31 are slidably carried by the outer face and side walls of the rim 15 of the rotor C. These strips 30 and 31 are fitted in grooves formed in the outer face of the rim and the side faces of the rim and normally urged outwardly into engagement with the inner faces of the stator by means of expansion springs 32. Thus it can be seen that the strips provide a leak proof connection between the rotor and the stator. To further prevent leakage between the rotor and stator annular rings 33 are eccentrically mounted in grooves 34 formed in the opposite side faces of the rim 15 of the rotor.

The stator B is provided with a plurality of inwardly extending sliding abutments or baffle plates 35 and an abutment or baffle plate is provided for each one of the cam chambers 17. These abutment plates 35 carry a plurality of outwardly extending stems 36 which are slidably mounted in a substantially U-shaped guide 37 secured at spaced points to the outer surface of the stator B. The stems 36 have coiled around the same contractile springs 38 which are connected respectively to the passage 37 and the outer ends of the stems. Thus it will be seen that the partitions 35 are normally urged into the chambers 17. Owing to the fact that the inner walls 18 of the chambers 17 are inclined, the sliding abutments or baffle plates 35 will be gradually forced outwardly as the rotor is placed in position, thereby permitting the passage of the projections by the same. The bores 28 formed in the rim of the rotor, form the means for conveying the compressed gases or charge to the firing chamber as will be hereinafter more fully described and these passages or bores are substantially oval shaped in cross section so as to permit of a relatively large bore being had at the narrow portion of the rim. Certain of the diametrically opposed chambers 17 define intake compartments 40 and these compartments are provided with inlet openings 41. Certain other of the chambers 17 are arranged in spaced relation to the intake compartments 40 define firing compartments 42 while the chambers 17 between the intake and firing compartments define compression compartments 43. The intake compartments 40 have also communicating therewith in spaced relation to the inlet ports 41, the outlet ports 44. The explosion chambers 42 have arranged therein the spark plugs 45, and the spark plugs are controlled by any suitable timing and ignition system desirable.

In operation of the improved motor, when the rotor C is in the position shown in Figure 1 of the drawings, and the same is being rotated to be set in operation, the charge will be drawn in through the inlet ports 41 as the rotor is moved in a clockwise direction, owing to the fact that a partial vacuum will be formed in the compartments 40 between the shoulder or walls 19 and the abutment or baffle plates 35. As the compartments which have the charges therein are moved a portion of a circle the next baffle or abutment plate 35 will ride into the chamber and gradually compress and force the charge toward the narrow end of the compartment and thus drive the charge through the check valves 29 into the bores 28. When the compartment having the compressed charge in the bores 28 move toward the next baffle or abutment plate 35, the outer ends of the bores communicate with passageways 46, which are formed in the firing compartments 42 of the stator. As stated the inner ends of the bores will communicate with the passageways 46, thereby permitting the compressed charges to be again brought into the chamber 17. As soon as the bores ride out of engagement with the passageway 46, the spark plugs 45 will explode the charge, thereby driving the rotor around in the stator. This operation is continuous and it can be seen that during one rotation of the rotor twelve distinct power impulses are given to the rotor. As stated, any number of chambers 17 can be provided in the rotor and thus the power impulses can be increased or decreased as desired.

It also can be seen that the chambers 17 may be formed in the stator B and the baffle abutment plates carried by the rotor is so desired without departing from the spirit of the invention.

From the foregoing description it can be seen that an improved rotary internal combustion engine has been provided which is exceptionally simple and durable in construction, and which will entirely eliminate the inconveniences contingent with the ordinary internal combustion engines now in vogue. The improved motor also obviates the employance of the intricate and complicated mechanisms embodied in the ordinary internal combustion engine.

Changes in details may be made without departing from the spirit or scope of the invention; but,

I claim:

1. In a rotary explosive engine, a stator, a rotor revoluble in the stator, compressing and firing chambers arranged intermediate the stator and rotor, sliding abutment plates arranged in the chambers, spring means normally urging the abutment plates in the chambers, inlet ports communicating with the chambers, outlet ports communicating with the chambers, and compression passageways adapted to connect one end of the chambers with the other end of the chambers.

2. In a rotary internal combustion engine, a stator, a rotor, firing and explosive chambers arranged intermediate the rotor and stator, the firing chambers having inclined walls, spring pressed abutment plates slidably mounted in the chambers and arranged to be forced outwardly by said inclined walls, inlet and outlet ports communicating with the chambers, the abutment plates being adapted to cause a suction in the chamber upon rotary movement of the rotor to suck the charge into one end of the chamber and compress the gas in the opposite end of the chambers, and means connecting the opposite ends of the chamber.

3. In a rotary explosive engine, a stator, a plurality of inwardly extending spaced abutment plates carried by the stator defining intake, compression, explosive chambers, a rotor revoluble within the stator having chambers formed therein adapted to move in the chambers defined by the abutment plates, the inner walls of the rotor chambers being inclined and arranged to engage the abutment plates, and compression passageways formed in the rotor and arranged to permit the flow of the charge from the one end of one chamber into the opposite end thereof.

4. In a rotary explosive engine, a stator, a plurality of inwardly extending spring pressed abutment plates carried by the stator defining a plurality of chambers, inlet and outlet ports communicating with certain of the chambers, spark plugs carried by certain other of the chambers, compression chambers arranged intermediate the mentioned chambers, a rotor revoluble in the stator, the periphery of the rotor having a plurality of chambers formed therein provided with inclined bottom walls arranged to engage the sliding plates, the plates being adapted to cooperate with the rotor for sucking in and compressing the charge, compression passageways extending through the rotor rim and communicating with the relatively narrow portion thereof and slightly in advance of the relatively deep portion thereof, the inner surface of the stator having grooves adapted to register with one end of said passageways.

5. In a rotary explosive engine, a stator, a plurality of inwardly extending spring pressed abutment plates carried by the stator defining a plurality of chambers, inlet and outlet ports communicating with certain of the chambers, spark plugs carried by certain other of the chambers, compression chambers arranged intermediate the mentioned chambers, a rotor revoluble in the stator, the periphery of the rotor having a plurality of chambers formed therein provided with inclined bottom walls arranged to engage the sliding plates, compression passageways extending through the rim and communicating with the relatively narrow portions of the chambers and slightly in advance of the relatively deep portions thereof, the inner surface of the stator having grooves therein adapted to register with one end of said compression passageways, and check valves arranged in said compression passageways.

6. In an internal combustion engine, a stator having a plurality of inwardly extending sliding abutment plates, a rotor revoluble in the stator having a plurality of spaced chambers formed in the periphery thereof, the inner walls of the chambers being inclined defining abutment faces, means for introducing, compressing and firing a charge in the chambers, compression passageways connecting one end of each chamber with the other end of the chamber, outwardly extending spring pressed members carried by the abutment faces arranged to engage the inner face of the stator, and inwardly extending nipples carried by the inner surface members communicating with the compression passageways.

WESLEY K. DAVIS.